United States Patent
Choi et al.

(10) Patent No.: US 8,095,924 B2
(45) Date of Patent: Jan. 10, 2012

(54) METHOD AND APPARATUS TO UPGRADE DRIVER OF IMAGE FORMING APPARATUS

(75) Inventors: In-sung Choi, Seoul (KR); Sang-hyup Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1343 days.

(21) Appl. No.: 11/422,688

(22) Filed: Jun. 7, 2006

(65) Prior Publication Data

US 2006/0279778 A1 Dec. 14, 2006

(30) Foreign Application Priority Data

Jun. 8, 2005 (KR) .................. 10-2005-0048896

(51) Int. Cl.
*G06F 9/45* (2006.01)
(52) U.S. Cl. ....................................... 717/173
(58) Field of Classification Search ............ 717/173
See application file for complete search history.

(56) References Cited

U.S. PATENT DOCUMENTS

| | | | | | |
|---|---|---|---|---|---|
| 6,009,274 | A * | 12/1999 | Fletcher et al. | ............... | 717/173 |
| 6,530,018 | B2 * | 3/2003 | Fleming, III | ................ | 713/1 |
| 6,567,860 | B1 * | 5/2003 | Maxwell et al. | ............ | 719/327 |
| 6,578,142 | B1 * | 6/2003 | Anderson et al. | .............. | 713/2 |
| 7,140,013 | B2 * | 11/2006 | Te'eni et al. | ................. | 717/173 |
| 7,143,408 | B2 * | 11/2006 | Anderson et al. | ............ | 717/175 |
| 7,146,542 | B2 * | 12/2006 | Srinivasan et al. | ............. | 714/44 |
| 7,304,758 | B2 * | 12/2007 | Ferlitsch | ...................... | 358/1.15 |
| 7,640,368 | B2 * | 12/2009 | Kim et al. | ......................... | 710/8 |
| 2003/0051011 | A1 * | 3/2003 | Schacht et al. | ............... | 709/221 |
| 2003/0184784 | A1 * | 10/2003 | Ferlitsch | ...................... | 358/1.13 |
| 2004/0215744 | A1 * | 10/2004 | Motoyama et al. | ........... | 709/217 |
| 2005/0132090 | A1 * | 6/2005 | Kim et al. | ......................... | 710/1 |
| 2005/0160157 | A1 * | 7/2005 | Collier et al. | ................. | 709/222 |
| 2005/0204363 | A1 * | 9/2005 | Bezanson et al. | ............. | 719/321 |
| 2005/0257218 | A1 * | 11/2005 | Lin | .............................. | 717/178 |
| 2005/0260996 | A1 * | 11/2005 | Groenendaal | ................ | 455/445 |
| 2006/0059482 | A1 * | 3/2006 | Chamberlin et al. | .......... | 717/176 |
| 2008/0151283 | A1 * | 6/2008 | Wang et al. | .................. | 358/1.13 |

FOREIGN PATENT DOCUMENTS

| | | |
|---|---|---|
| CN | 1598770 | 3/2005 |
| CN | 1601499 | 3/2005 |
| JP | 9-251355 | 9/1997 |
| JP | 11-327828 | 11/1999 |
| JP | 2001-51810 | 2/2001 |
| JP | 2005-107842 | 4/2005 |

OTHER PUBLICATIONS

Korean Office Action dated Aug. 29, 2006 issued in KR 2005-48896.
Chinese Office Action dated Jul. 13, 2007 issued in CN 200610110873.3.

* cited by examiner

*Primary Examiner* — John Chavis
(74) *Attorney, Agent, or Firm* — Stanzione & Kim, LLP

(57) ABSTRACT

A method and apparatus to upgrade a driver of an image forming apparatus. The method includes accessing a website having a website driver program useable by the image forming apparatus, converting a class mode of the image forming apparatus from an original class mode to a predetermined class mode that is different from the original class mode, comparing a driver program stored in the image forming apparatus with the website driver program on the website, and downloading the website driver program from the website and storing the website driver program in the image forming apparatus when the website driver program is a later version than the stored driver program.

18 Claims, 4 Drawing Sheets

METHOD AND APPARATUS TO UPGRADE DRIVER OF IMAGE FORMING APPARATUS

CROSS-REFERENCE TO RELATED APPLICATIONS

This application claims priority under 35 U.S.C. §119(a) from Korean Patent Application No. 10-2005-0048896, filed on Jun. 8, 2005, in the Korean Intellectual Property Office, the disclosure of which is incorporated herein in its entirety by reference.

BACKGROUND OF THE INVENTION

1. Field of the Invention

The present general inventive concept relates to an image forming apparatus, and more particularly, to a method and apparatus to upgrade a driver program of an image forming apparatus.

2. Description of the Related Art

Figure 1:
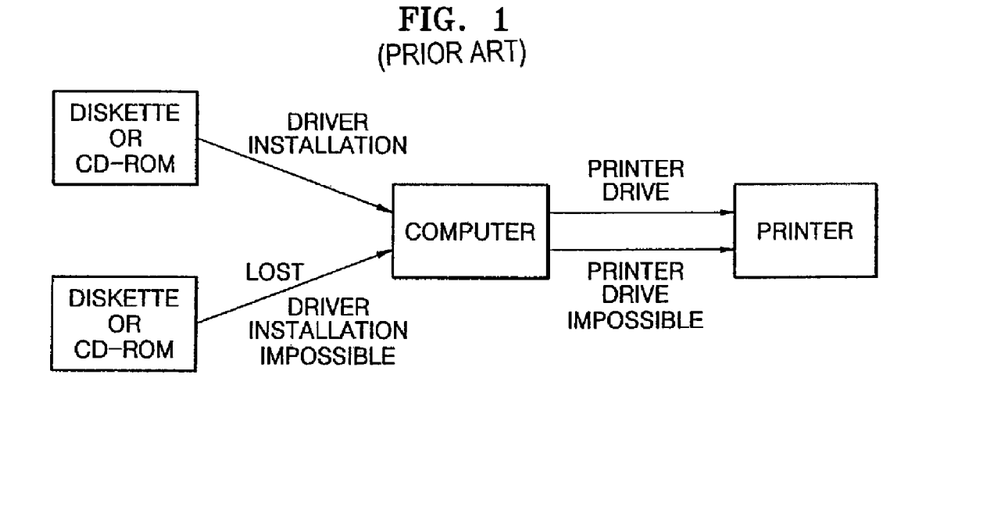
FIG. 1 illustrates a conventional installation and operation of a driver using a portable storage medium.

A device, such as a printer, requires a driver program to operate the device to be installed in a host device, such as a computer. FIG. 1 illustrates a conventional installation and operation of a driver using a portable storage medium, such as a diskette and a CD-ROM. As illustrated in FIG. 1, the driver program has been provided via a portable storage medium, such as a CD-ROM and a floppy disk, when a printer is purchased. A user, however, may encounter an inconvenience in a case where the user loses the portable storage medium including the driver program provided at a time when the printer is purchased, or in a case where the user is not skilled in using a computer.

Figure 2:
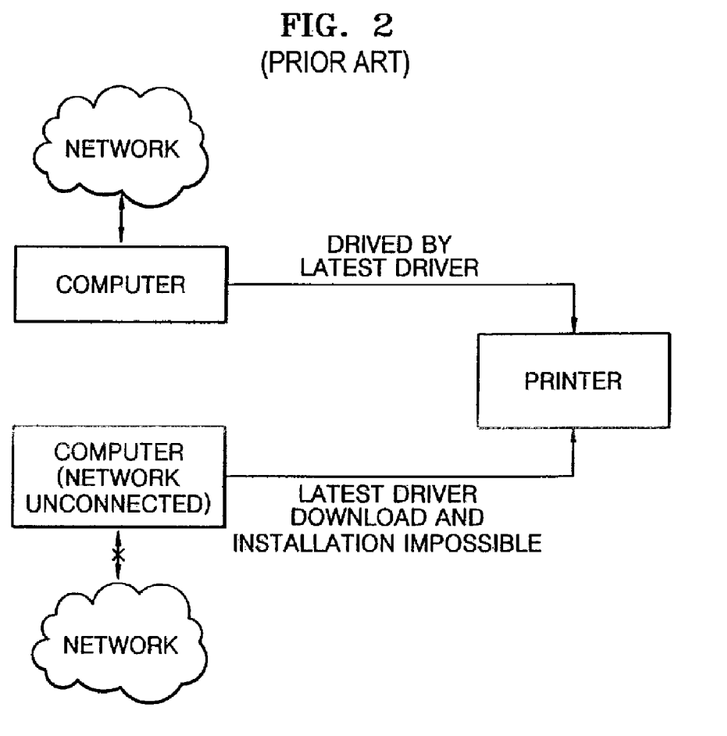
FIG. 2 illustrates a conventional download of a latest driver program through a network and an installation thereof on a computer.

In addition, when functions of the driver program are continuously upgraded, there is a need to update the driver program in the printer. FIG. 2 illustrates a conventional download of a latest driver program through a network and an installation thereof in a computer. However, a portable storage medium, such as a CD-ROM and a floppy disk, which are provided at a time when a printer is purchased, is not upgraded. In addition, as illustrated in FIG. 2, even if the driver program is upgraded through a network, a printer cannot be operated by the latest driver in other computers which are not connected to the network. For this reason, there is a limitation in using a printer driver having upgraded capabilities, and this causes a user's dissatisfaction, resulting in a decrease of product reliabilities.

A conventional printer driver is installed as follows.

By using a driver program stored in a portable storage medium, such as a CD-ROM and a floppy disk, which are provided at a time when the printer is purchased, a printer driver is installed on a computer connected to the printer. In addition, if there is a need for an upgrade of the printer driver, a corresponding upgrade website is accessed to upgrade the printer driver using a network. The upgraded driver, however, is installed only in a corresponding computer, and the printer driver thereby must be upgraded again through the network when the printer is moved and connected to another computer. Here, there is a disadvantage that the latest driver cannot be used in a computer which is not connected to the network.

SUMMARY OF THE INVENTION

The present general inventive concept provides a method and apparatus to upgrade a driver of a multi-mode image forming apparatus (e.g., a printer class mode and a CD-ROM class mode), which is recognizable as an independent external storage device having an automatic storage capability along with a printing capability, so as to enhance a user's convenience and satisfaction by storing a latest driver program in a printer irrespective of a host device without relying on an extra portable storage medium.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of upgrading a driver program of the image forming apparatus, including accessing a website having a website driver program useable by the image forming apparatus, converting a class mode of the image forming apparatus from an original class mode to a predetermined class mode that is different from the original class mode, comparing a stored driver program stored in the image forming apparatus with the website driver program on the website, and downloading the website driver program from the website and storing the website driver program in the image forming apparatus when the website driver program is a later version than the stored driver program.

The method may further include installing the downloaded website driver program, which is stored in the image forming apparatus, in a host device connected to the image forming apparatus. The method may further include converting the class mode of the image forming apparatus from the predetermined class mode to the original class mode when the installation of the website driver program in the host device is completed. The comparing of the stored driver program with the website driver program may include reading version information corresponding to the stored driver program from the image forming apparatus and version information corresponding to the website driver program from the website, and comparing the version information corresponding to the stored driver program from the image forming apparatus and the version information corresponding to the website driver program from the website. The comparing of the stored driver program with the website driver program may include indicating to a user that the stored driver program is a latest driver version when the website driver program is not a later version than the stored driver program, and converting the class mode of the image forming apparatus from the predetermined class mode to the original class mode.

The foregoing and/or other aspects and utilities of the present general inventive concept may also be achieved by providing an apparatus to upgrade a driver program of an image forming apparatus, including a latest-driver information acquisition unit to read version information of a website driver program useable in the image forming apparatus by accessing a website having the website driver program, a class mode conversion unit to convert a class mode of the image forming apparatus from an original class mode to a predetermined class mode that is different from the original class mode, a driver comparison unit to read version information of a driver program stored in the image forming apparatus and to compare the version information of the stored driver program with the version information of the website driver program read by the driver information acquisition unit and a driver upgrade unit to download the website driver program of the website and to store the website driver program in the image forming apparatus when the website driver program is a later version than the stored driver program.

The driver upgrade unit may install the downloaded website driver program, which is stored in the image forming apparatus, in a host device connected to the image forming apparatus. The class mode conversion unit may convert the class mode of the image forming apparatus from the predetermined class mode to the original class mode when the driver installation is completed.

The apparatus may further include an upgrade indicator unit to indicate to a user that the stored driver program is a latest driver version when a result of the comparison by the driver comparison unit indicates that the website driver program is not a later version than the stored driver program, in which the class mode conversion unit converts the class mode of the image forming apparatus from the predetermined class mode to the original class mode when the result of the comparison by the driver comparison unit indicates that the website driver program is not a later version than the stored driver program.

The foregoing and/or other aspects and utilities of the present general inventive concept may also be achieved by providing a computer-readable medium including a computer program to perform a method of upgrading a driver of an image forming apparatus, the method including accessing a website having a website driver program useable by the image forming apparatus, converting a class mode of the image forming apparatus from an original class mode to a predetermined class mode that is different from the original class mode, comparing a driver program stored in the image forming apparatus with the website driver program on the website, and downloading the website driver program from the website and storing the website driver program in the image forming apparatus when the website driver program is a later version than the stored driver program.

The foregoing and/or other aspects and utilities of the present general inventive concept may be achieved by providing an image forming system, including an image forming apparatus having an image forming mode and a storage mode, and a host device, including a comparing unit to compare version information corresponding to a driver stored in the storage unit of the image forming apparatus with version information corresponding to a driver downloadable through a network and external to the image forming apparatus while the image forming apparatus is in the storage mode to determine a most current version information among the version information corresponding to the stored driver and the version information corresponding to the downloadable driver, an upgrade unit to download and install the downloadable driver to the image forming apparatus when the version information corresponding to the downloadable driver is more current than the version information corresponding to the stored driver, a notification unit to notify a user that the stored driver is the most current version driver when the version information corresponding to the downloadable driver is not more current than the version information corresponding to the stored driver, and a conversion unit to convert the image forming apparatus to the image forming mode after the installation of the downloadable driver or after the notification of the user.

The upgrade unit may install the downloadable driver to the host device after the installation of the downloadable driver to the image forming apparatus. The upgrade unit may use an auto-install program stored in the image forming apparatus to install the downloadable driver to the host device. The upgrade unit may install the downloadable driver to a second host device connected to the image forming apparatus through the network.

The foregoing and/or other aspects and utilities of the present general inventive concept may be achieved by providing a method of determining whether to upgrade a driver stored in an image forming apparatus having an image forming mode and a storage mode, the method including comparing version information corresponding to the stored driver with version information corresponding to a driver downloadable through a network and external to the image forming apparatus while the image forming apparatus is in the storage mode to determine a most current version information among the version information corresponding to the stored driver and the version information corresponding to the downloadable driver, determining to upgrade the stored driver when the version information corresponding to the downloadable driver is more current than the version information corresponding to the stored driver, and determining not to upgrade the stored driver when the version information corresponding to the downloadable driver is not more current than the version information corresponding to the stored driver.

The determining to upgrade the stored driver may include downloading and installing the downloadable driver program to the image forming apparatus, and putting the image forming apparatus in the image forming mode. The method may further include installing the downloadable driver to a host device connected to the image forming apparatus. The installing the downloadable driver to the host device may include installing the downloadable driver to the host device using an auto-install program stored in the image forming apparatus. The method may further include installing the downloadable driver to a second host device connected to the image forming apparatus through the network. The determining not to upgrade the stored driver may include notifying a user that the stored driver is a most current version driver, and putting the image forming apparatus in the image forming mode.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 3:
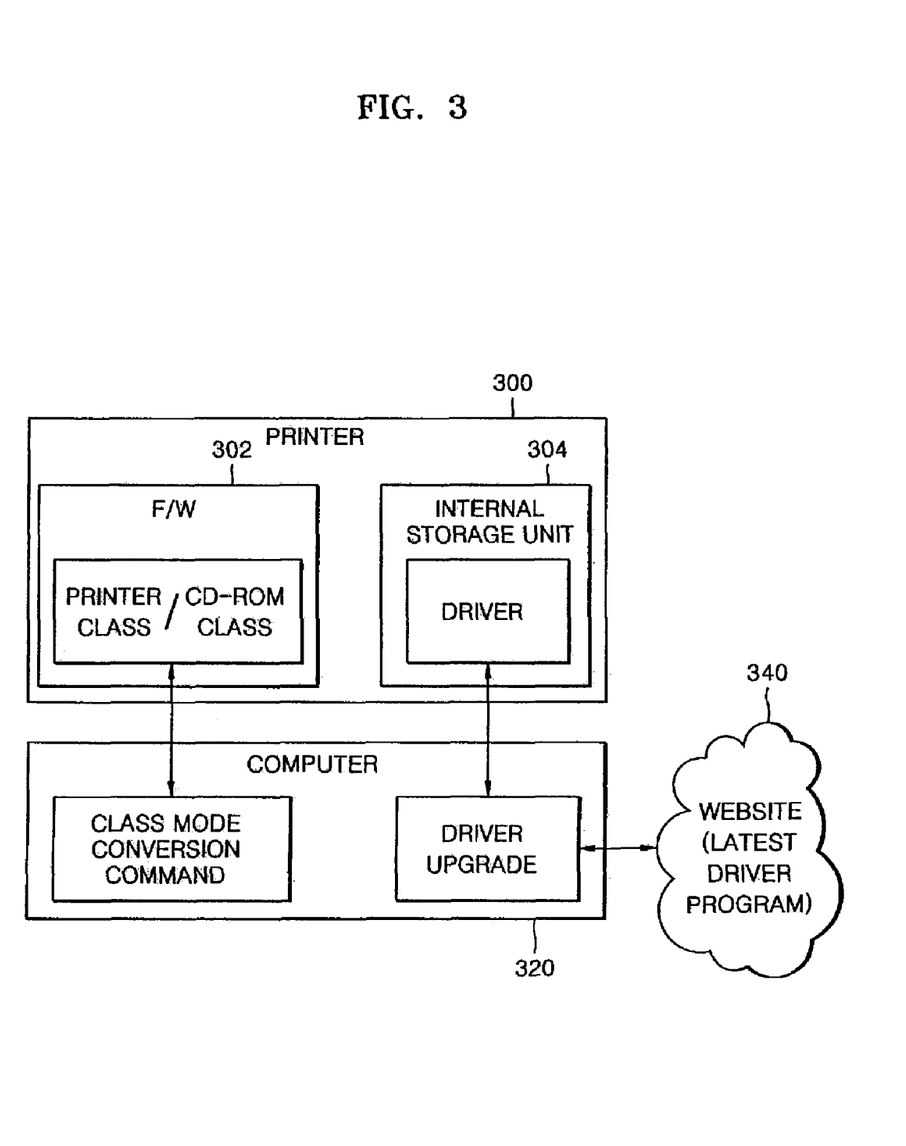
FIG. 3 illustrates a driver upgrade system of an image forming apparatus, according to an embodiment of the present general inventive concept.

FIG. 3 illustrates a driver upgrade system of an image forming apparatus, according to an embodiment of the present general inventive concept. The driver upgrade system may include a printer 300 as the image forming apparatus, a computer 320 as a host device, and a website 340 to provide a latest driver program. The image forming apparatus can be, for example, one of the printer 300, a copy machine, a scanner, and a fax machine. Hereinafter, the printer 300 will be described as an example of the image forming apparatus and the computer 320 will be described as an example of the host device. However, the image forming apparatus and the host device of the present general inventive concept are not limited to these examples. Hereafter, the terms "driver" and "driver program" are used interchangeably.

The printer 300 has two class modes. Information corresponding to the class modes is provided in a firm wave (F/W) 302 of the printer 300, and the computer 320 recognizes the printer 300 according to the information corresponding to the class modes. A first class mode is an original class mode of the image forming apparatus, which is a printer class mode if the image forming apparatus is the printer 300. A second class mode can be a CD-ROM class mode, which is an extra predetermined class mode different from the original class mode of the image forming apparatus (i.e., the printer 300 in this embodiment). In this manner, the class mode is automatically converted so that the computer 320 can recognize the printer 300 as a printing device and as a storing device. When the printer 300 is set to the printer class mode, the computer 320 (which is the host device in this embodiment) recognizes the printer 300 as a printer, and a printing operation is performed by the printer 300. If the printer 300 is set to the CD-ROM class mode, the computer 320 (which is the host device in this embodiment) recognizes the printer 300 as a CD-ROM, and data can be read from and written to the printer 300.

Figure 4:
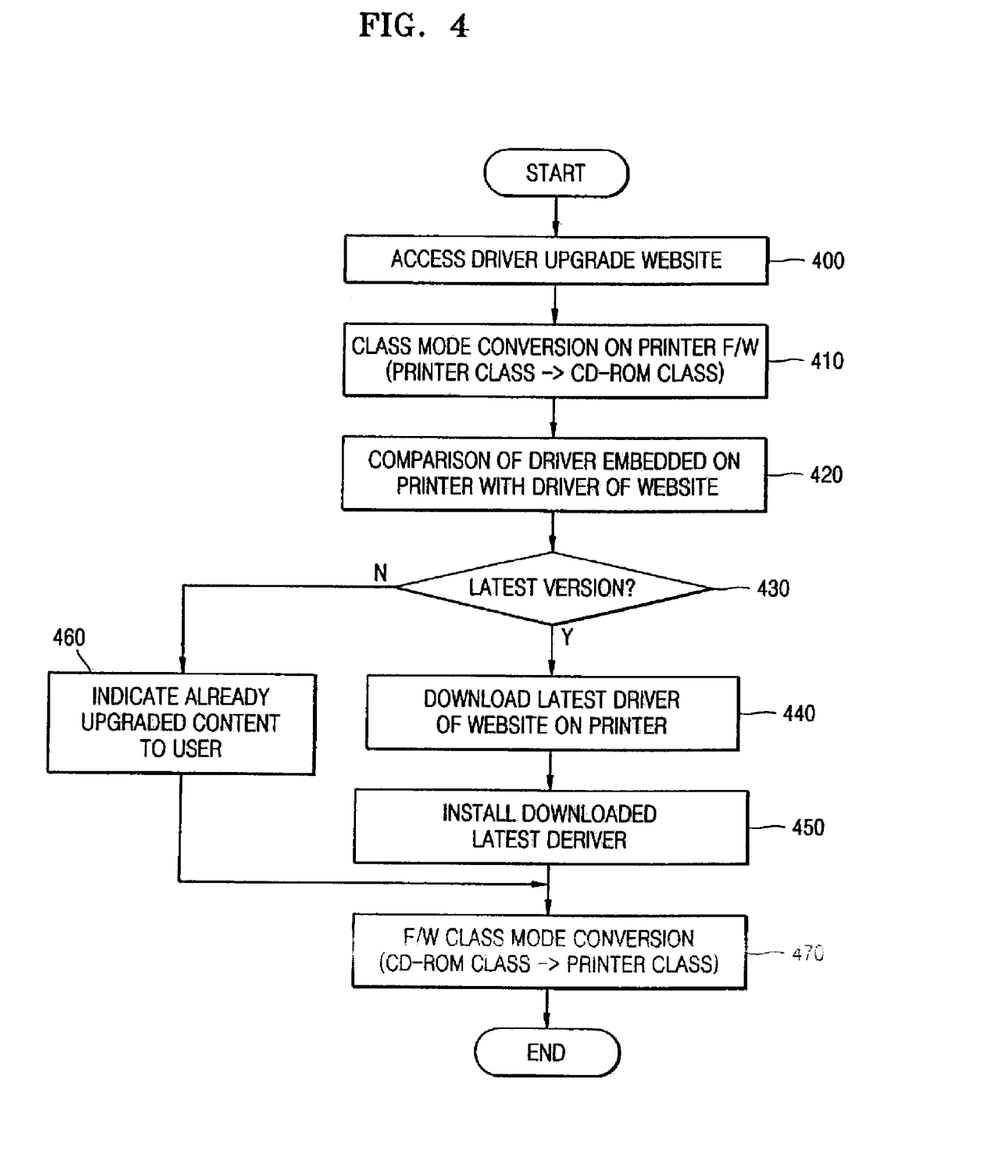
FIG. 4 is a flowchart illustrating a method of upgrading a driver an image forming apparatus, according to an embodiment of the present general inventive concept.

FIG. 4 is a flowchart illustrating a method of upgrading a driver of an image forming apparatus (e.g., the printer 300 of FIG. 3), according to an embodiment of the present general inventive concept. Referring to FIGS. 3 and 4, the method of upgrading the driver of the image forming apparatus (i.e., the printer 300) will be described.

First, when a user desires to upgrade the driver of the printer 300, the computer 320 accesses the website 340 through a network (the website 340 providing a website printer driver program) to upgrade the printer driver of the printer 300 (operation 400). Here, the computer 320 generates a class mode conversion instruction, and the firm ware (F/W) 302 converts the class mode of the printer 300 based on the instruction (operation 410). That is, the class mode of the printer 300 is converted from the original printer class mode to the CD-ROM class.

Next, the computer 320 compares the driver program registered in an internal memory 304 of the printer 300 with the website driver program provided on the website 340 connected to the computer 320 through the network (operation 420). The driver programs may be compared to each other by comparing versions thereof. In particular, first version information corresponding to the driver program registered in the internal memory 304 of the printer 300 may be compared to second version information corresponding to the website driver program provided on the website 340. If the comparison results indicate that the website driver provided on the website 340 is a later version than the driver stored in the internal memory 304 of the printer 300 (operation 430), the website driver provided on the website 340 is downloaded to the internal memory 304 of the printer 300 (operation 440). Next, the downloaded website driver is installed in the computer 320 (operation 450). Here, the installation of the website driver in the computer 320 is performed by using an auto-run program stored in the internal memory 304 of the printer 300. When the installation of the latest driver program on the computer 320 is completed, a class mode conversion instruction is issued to the F/W 302 of the printer 300, and the F/W 302 of the printer 300 converts the class mode from the CD-ROM class mode to the printer class mode (operation 470). In this manner, the computer 320 can use the upgraded website driver to print using the printer 300.

Meanwhile, if the comparison result indicates that the website driver provided on the website 340 is not a later version than the driver stored in the internal memory 304 of the printer 300 (operation 430), a dialog indicating that an upgraded driver program is already stored in the printer 300 is displayed for a user (operation 460). In addition, the class mode conversion instruction is issued to the F/W 302 of the printer 300, so that the F/W 302 of the printer 300 converts the class mode from the CD-ROM class mode to the printer class mode (operation 470). In this manner, the computer 320 uses the existing driver to print using the printer 300.

Figure 5:
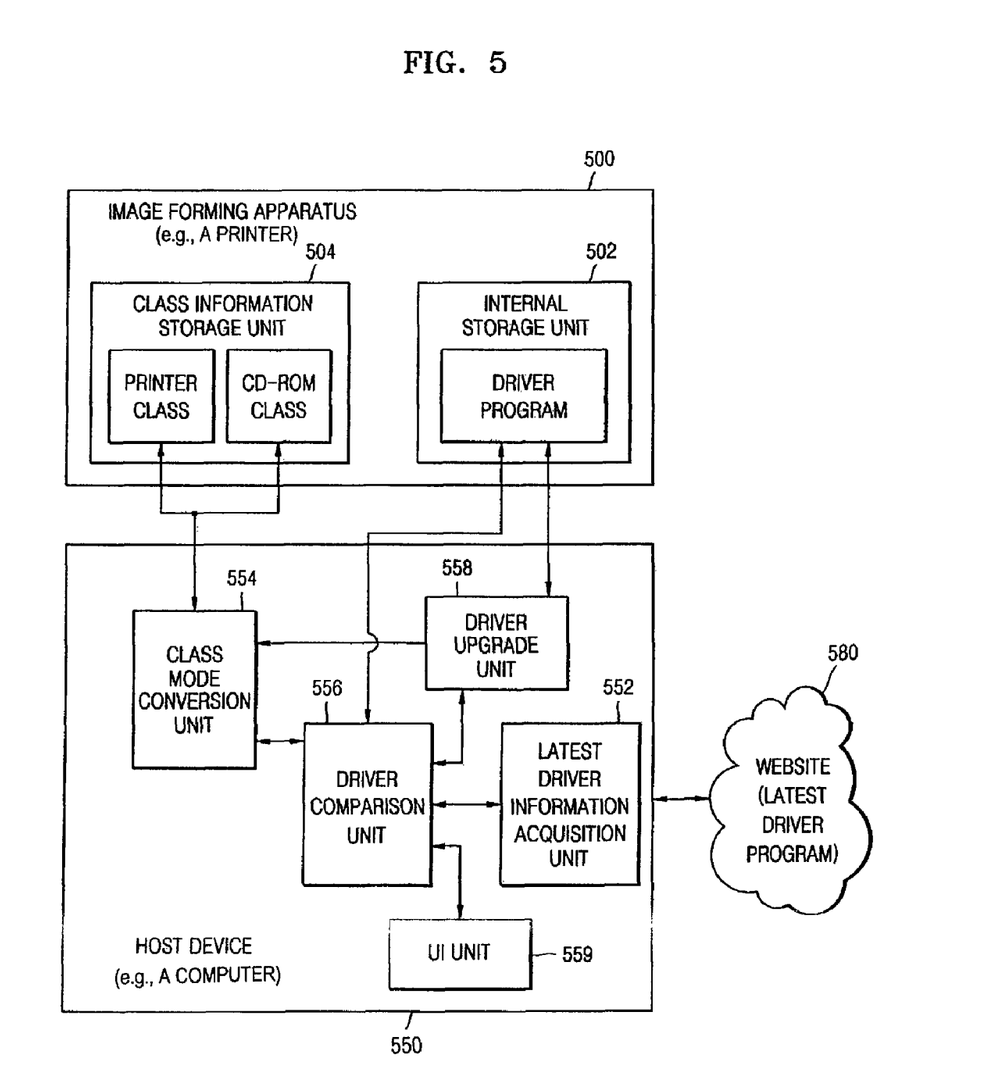
FIG. 5 is a block diagram illustrating a structure of a device to upgrade a driver of an image forming apparatus, according to an embodiment of the present general inventive concept.

FIG. 5 is a block diagram illustrating a structure of an apparatus 550 to upgrade a driver of an image forming apparatus 500, according to an embodiment of the present general inventive concept. The apparatus may be a host device 550, and includes a latest-driver information acquisition unit 552, a class mode conversion unit 554, a driver comparison unit 556, and a driver upgrade unit 558.

The latest-driver information acquisition unit 552 reads version information corresponding to a website driver program useable with the image forming apparatus 500 by accessing a website 580 providing the website driver program. The class mode conversion unit 554 converts the class mode of the image forming apparatus 500 to an extra predetermined class mode that is different from an original class mode of the image forming apparatus 500. For example, where the image forming apparatus 500 is a printer, the printer has a printer mode as an original class mode, and the class mode conversion unit 554 converts the class mode of the printer from the original printer mode to a predetermined class mode that is different from the printer mode. The driver comparison unit 556 reads version information corresponding to a driver program stored in the image forming apparatus 500 and compares the version information of the stored driver program with the version information of the website driver program read by the driver information acquisition unit 552. The driver upgrade unit 558 downloads the website driver of the website 580 when the website driver on the website 580 is a later version than the stored driver stored in the image forming apparatus 500, and stores the downloaded website driver in the image forming apparatus 500.

The driver upgrade unit 558 may also function to install the downloaded website driver program (after the downloaded website driver program has been stored in the image forming apparatus 500) in the host device 550. Here, the class mode conversion unit 554 further functions to convert the class mode of the image forming apparatus 500 to the original class mode thereof when the driver installation is completed.

In addition, a UI (upgrade indicating) unit 559 is further included in the host device 550. The UI unit 559 displays a dialog indicating that an upgraded driver program is already stored in the image forming apparatus 500 for a user if the comparison result by driver comparison unit 556 indicates that the stored driver stored in an internal storage unit 502 of the image forming apparatus 500 is a latest driver version. Here, the class mode conversion unit 554 further functions to convert the class mode of the image forming apparatus 500 to the original class thereof when the comparison result of the driver comparison unit 556 indicates that the stored driver stored in the internal storage unit 502 of the image forming apparatus 500 is the latest driver version.

Referring to FIG. 5, operations of the apparatus 500 to upgrade the driver of the image forming apparatus 500, according to an embodiment of the present general inventive concept, will be described. First, when a user desires to upgrade the driver of the image forming apparatus 500, the latest-driver information acquisition unit 552 accesses the website 580 that provides an upgraded website driver useable with the image forming apparatus 500, which is connected to the network. Specifically, the latest-driver information acquisition unit 552 reads version information of the website driver program provided on the website 580. Here, the class mode conversion unit 554 of the host device 550 converts a class mode information of a class information storage unit 504 of the image forming apparatus 500 from a printer class mode to a CD-ROM class mode. In addition, the driver comparison unit 556 compares the version information of the website driver program read by the latest-driver information acquisition unit 552 and a stored driver program registered in the internal storage unit 502 of the image forming apparatus 500 to determine whether the stored driver stored in the internal storage unit 502 of the image forming apparatus 500 is the latest driver version.

If the driver stored in the internal storage unit 502 of the image forming apparatus 500 is not the latest version of the driver, a driver upgrade is needed, and the website driver program is downloaded from the website 580 and stored in the internal storage unit 502 of the printer 500. After the downloaded website driver is installed in the host device 550, the class mode of the image forming apparatus 500 is converted from the CD-ROM class mode to the printer class mode by the class mode conversion unit 554.

On the other hand, if the comparison result of the driver comparison unit 556 indicates that the stored driver of the internal storage unit 502 of the image forming apparatus 500 is the latest driver version, the UI unit 559 indicates this comparison result to a user. The class mode conversion unit 554 then converts the class mode of the class information storage unit 504 of the printer 500 from the CD-ROM class mode to the printer class mode.

An image forming system according to embodiments of the present general inventive concept may include an image forming apparatus having an image forming mode and a storage mode, and a host device including a comparing unit to compare version information corresponding to a driver stored in the storage unit of the image forming apparatus with version information corresponding to a driver downloadable through a network and external to the image forming apparatus while the image forming apparatus is in the storage mode to determine a most current version information among the version information corresponding to the stored driver and the version information corresponding to the downloadable driver, an upgrade unit to download and install the downloadable driver to the image forming apparatus when the version information corresponding to the downloadable driver is more current than the version information corresponding to the stored driver, a notification unit to notify a user that the stored driver is the most current version driver when the version information corresponding to the downloadable driver is not more current than the version information corresponding to the stored driver, and a conversion unit to convert the image forming apparatus to the image forming mode after the installation of the downloadable driver or after the notification of the user.

The upgrade unit may install the downloadable driver to the host device after the installation of the downloadable driver to the image forming apparatus. The upgrade unit may use an auto-install program stored in the image forming apparatus to install the downloadable driver to the host device. The upgrade unit may install the downloadable driver to a second host device connected to the image forming apparatus through the network.

Accordingly, in a method and apparatus to upgrade a driver of an image forming apparatus, according to embodiments of the present general inventive concept, an internal storage unit is provided in the image forming apparatus by converting a class mode of the image forming apparatus to be an external storage device class mode so that an external driver that is a latest version can be automatically stored in the image forming apparatus at any time without an extra portable medium. In addition, a user can store and use the latest driver irrespective of a host device, so that the user's convenience and satisfaction are enhanced and a maintenance cost of the image forming apparatus can be reduced. Moreover, the latest driver is stored in the internal storage unit of the image forming apparatus, so that the latest driver can be independently installed in and used with a host device (e.g., a computer) to which the image forming apparatus is later-connected.

Various embodiments of the present general inventive concept can be embodied as computer (i.e., any device having information processing capabilities is included) readable codes on computer readable medium. The computer readable recording medium may be any data storage device that can store data which can be thereafter read by a computer system. Examples of the computer readable recording medium include, but are not limited to, read-only memory (ROM), random-access memory (RAM), CD-ROMS, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Various embodiments of the present general inventive concept may also be embodied in hardware or in a combination of hardware and software.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of upgrading a driver of an image forming apparatus, comprising:
   accessing a website having a website driver program useable by the image forming apparatus;
   converting a class mode of the image forming apparatus from an original class mode to a predetermined class mode that is different from the original class mode;
   comparing a stored driver program stored in the image forming apparatus with the website driver program on the website;
   automatically downloading the website driver program from the website and storing the website driver program in the image forming apparatus when the comparing determines that the website driver program is a later version than the stored driver program; and
   converting the class mode of the image forming apparatus from the predetermined class mode to the original class mode when an installation of the website driver program in a host device that is connected to the image forming apparatus is completed.

2. The method of claim 1, wherein the comparing of the stored driver program with the website driver program comprises:
  reading version information corresponding to the stored driver program from the image forming apparatus and version information corresponding to the website driver program from the website; and
  comparing the version information corresponding to the stored driver program from the image forming apparatus and the version information corresponding to the website driver program from the website.

3. The method of claim 1, wherein the comparing of the stored driver program with the website driver program comprises:
  indicating to a user that the stored driver program is a latest driver version when the website driver program is not a later version than the stored driver program; and
  converting the class mode of the image forming apparatus from the predetermined class mode to the original class mode.

4. The method of claim 1, wherein the class mode of the image forming apparatus comprises a printer class mode as the original class mode and a CD-ROM class mode as the predetermined class mode.

5. The method of claim 1, wherein the image forming apparatus is one of a printer, a copy machine, a scanner, and a fax machine.

6. An apparatus to upgrade a driver of an image forming apparatus, comprising:
  a latest-driver information acquisition unit to read version information of a website driver program useable in the image forming apparatus by accessing a website having the website driver program;
  a class mode conversion unit to convert a class mode of the image forming apparatus from an original class mode to a predetermined class mode that is different from the original class mode;
  a driver comparison unit to read version information of a driver program stored in the image forming apparatus and to compare the stored version information of the stored driver program with the version information of the website driver program read by the driver information acquisition unit; and
  a driver upgrade unit to automatically download the website driver program of the website and to store the website driver program in the image forming apparatus when the driver comparison unit determines that the website driver program is a later version than the stored driver program,
  wherein the class mode conversion unit converts the class mode of the image forming apparatus from the predetermined class mode to the original class mode when an installation of the downloaded website driver program in a host device connected to the image forming apparatus is completed.

7. The apparatus of claim 6 further comprising:
  an upgrade indicator unit to indicate to a user that the stored driver program is a latest driver version when a result of the comparison by the driver comparison unit indicates that the website driver program is not a later version than the stored driver program,
  wherein the class mode conversion unit converts the class mode of the image forming apparatus from the predetermined class mode to the original class mode when the result of the comparison by the driver comparison unit indicates that the website driver program is not a later version than the stored driver program.

8. The apparatus of claim 6, wherein the class mode of the image forming apparatus comprises a printer class mode as the original class mode and a CD-ROM class mode as the predetermined class mode.

9. The apparatus of claim 6, wherein the image forming apparatus is one of among a printer, a copy machine, a scanner, and a fax machine.

10. A non-transitory computer-readable medium including a computer program to perform a method of upgrading a driver of an image forming apparatus, the method comprising:
  accessing a website having a website driver program useable by the image forming apparatus;
  converting a class mode of the image forming apparatus from an original class mode to a predetermined class mode that is different from the original class mode;
  comparing a driver program stored in the image forming apparatus with the website driver program on the website;
  automatically downloading the website driver program from the website and storing the website driver program in the image forming apparatus when the comparing determines that the website driver program is a later version than the stored driver program; and
  converting the class mode of the image forming apparatus from the predetermined class mode to the original class mode when an installation of the website driver program in a host device that is connected to the image forming apparatus is completed.

11. A method of determining whether to upgrade a driver stored in an image forming apparatus having an image forming mode and a storage mode, the method comprising:
  comparing version information corresponding to the stored driver with version information corresponding to a driver downloadable through a network and external to the image forming apparatus while the image forming apparatus is in the storage mode to determine a most current version information among the version information corresponding to the stored driver and the version information corresponding to the downloadable driver;
  determining to automatically upgrade the stored driver when the comparing determines that the version information corresponding to the downloadable driver is more current than the version information corresponding to the stored driver; and
  determining not to upgrade the stored driver when the comparing determines that the version information corresponding to the downloadable driver is not more current than the version information corresponding to the stored driver,
  wherein when it is determined to automatically upgrade the stored driver, converting a class mode of the image forming apparatus from an original class mode to a predetermined class mode that is different from the original class mode, upgrading the stored driver with the downloadable driver, and converting the class mode of the image forming apparatus from the predetermined class mode to the original class mode when the upgrading of the driver is completed.

12. The method of claim 11, wherein the determining to upgrade the stored driver comprises:
  downloading and installing the downloadable driver to the image forming apparatus; and
  putting the image forming apparatus in the image forming mode.

13. The method of claim 12, further comprising:
  installing the downloadable driver to a host device connected to the image forming apparatus.

14. The method of claim 13, wherein the installing the downloadable driver to the host device comprises:
  installing the downloadable driver to the host device using an auto-install program stored in the image forming apparatus.

15. The method of claim 13, further comprising:
  installing the downloadable driver to a second host device connected to the image forming apparatus through the network.

16. The method of claim 11, wherein the determining not to upgrade the stored driver comprises:
  notifying a user that the stored driver is a most current version driver; and
  putting the image forming apparatus in the image forming mode.

17. A method of upgrading a driver of an image forming apparatus, comprising:
  comparing a stored driver program stored in the image forming apparatus with a website driver program useable by the image forming apparatus that is stored on the website; and
  converting a class mode of the image forming apparatus from an original class mode to a predetermined class mode that is different from the original class mode. automatically downloading the website driver program from the website and storing the website driver program in the image forming apparatus when the comparing determines that the website driver program is a later version than the stored driver program, installing the downloaded website driver program, and converting the class mode of the image forming apparatus from the predetermined class mode to the original class mode when an installation of the driver program is completed.

18. An apparatus to upgrade a driver of an image forming apparatus, comprising:
  a class mode conversion unit to convert a class mode of the image forming apparatus from an original class mode to a predetermined class mode that is different from the original class mode;
  a driver comparison unit to read version information of a driver program stored in the image forming apparatus and to compare stored version information of the stored driver program with the version information of a website driver program useable by the image forming apparatus that is received from a website by the driver comparison unit; and
  a driver upgrade unit to automatically download the website driver program of the website and to store the website driver program in the image forming apparatus when the driver comparison unit determines that the website driver program is a later version than the stored driver program,
  wherein a class mode conversion unit converts the class mode of the image forming apparatus from the predetermined class mode to the original class mode when an installation of the downloaded website driver program is completed.

* * * * *